(12) United States Patent
Janik et al.

(10) Patent No.: US 7,196,801 B1
(45) Date of Patent: Mar. 27, 2007

(54) PATTERNED SUBSTRATE SURFACE MAPPING

(75) Inventors: Gary R. Janik, Palo Alto, CA (US);
Liang-Guo Wang, Fremont, CA (US);
Christopher M. Pohlhammer, San Ramon, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 440 days.

(21) Appl. No.: 10/771,020

(22) Filed: Feb. 3, 2004

(51) Int. Cl.
*G01B 11/30* (2006.01)

(52) U.S. Cl. ........................................ 356/606; 356/616
(58) Field of Classification Search ................ 356/394,
356/601–622; 250/559.22, 559.31, 559.38
See application file for complete search history.

(56) References Cited

U.S. PATENT DOCUMENTS

| | | | | |
|---|---|---|---|---|
| 4,708,483 A | * | 11/1987 | Lorenz | ........................ 356/602 |
| 5,602,400 A | * | 2/1997 | Kawashima | ................ 250/548 |
| 5,760,889 A | | 6/1998 | Manning | ..................... 356/124 |
| 5,912,738 A | | 6/1999 | Chason et al. | .............. 356/371 |
| 6,222,630 B1 | * | 4/2001 | Wasserman | .................. 356/388 |
| 6,608,689 B1 | | 8/2003 | Wei et al. | ................... 356/630 |
| 6,621,581 B1 | | 9/2003 | Hunt et al. | ................. 356/601 |
| 6,984,838 B2 | * | 1/2006 | Kosugi | ..................... 250/559.3 |

* cited by examiner

*Primary Examiner*—Hoa Q. Pham
(74) *Attorney, Agent, or Firm*—Luedeka, Neely, & Graham, P.C.

(57) ABSTRACT

A method for measuring a characteristic of a substrate, including directing an incident beam at an inspection grid of points on the substrate, receiving the reflected beam with a position sensitive detector, measuring the displacement of the reflected beam from its expected location, compiling a database of the displacement measurements, examining the database for effects of a pattern induced anomaly in the displacement measurements, producing an adjusted database, and deriving the characteristic of the substrate from the adjusted database. Thus, pattern induced errors from the displacement measurements are corrected. In this manner, problems with interpreting the reflection angles of a beam in substrate stress analysis equipment are overcome where distortions in the reflection angles are caused by deposition patterns on the substrates.

18 Claims, 2 Drawing Sheets

PATTERNED SUBSTRATE SURFACE MAPPING

FIELD

This invention relates to the field of integrated circuit fabrication and inspection. More particularly, this invention relates to the measurement of surface characteristics of substrates.

BACKGROUND

Integrated circuits are manufactured by processes such as sputtering, ion implantation, and chemical vapor deposition that create successive layers of thin films of electrically conducting, electrically non conducting, and electrically semiconducting materials on a substrate. Techniques such as those involving photo resistive chemicals, masks, ultraviolet light, and etching are used to create multiple layers of these materials in patterns that create the electronic pathways that form an integrated circuit. Typically, hundreds of identical integrated circuits are created simultaneously in a geometrically repetitive pattern on a single substrate. Often these processes are conducted at high temperatures and other process conditions that induce mechanical stress in the substrates. These stresses can eventually cause cracking, delaminating, voiding, and other defects in the integrated circuits. Such defects may not become apparent until much later in the manufacture of the integrated circuit, so it is important to measure the stress levels at successive stages in the fabrication process and cull defective substrates before investing more resources to complete their fabrication.

Excessive stresses in the thin films distort the flatness of the substrate. Various techniques have been developed over the years to measure this distortion and use that information to compute the residual stress. Most of these techniques employ a laser beam that impinges the surface of the substrate and deposited materials. The expected location of the reflected beam is calculated based upon the geometry of the apparatus. The displacement of the actual reflected beam from its expected location is used to map the topography of the substrate and deposited materials. Differences detected between successive maps of topographical information are typically input into the well known "Stoney's equation" to calculate the induced stress. A significant problem with this process is that patterns in the deposited materials distort the reflection angle of the laser beam, making it difficult to interpret the reflection displacement data.

What is needed is a system to overcome the problems with interpreting the reflection angles of a laser beam in substrate stress analysis equipment where distortions in the reflection angles are caused by deposition patterns on the substrates.

SUMMARY

The above and other needs are met by a method in one embodiment of this invention for measuring a characteristic of a substrate, including directing an incident beam at an inspection grid of points on the substrate, receiving the reflected beam with a position sensitive detector, measuring the displacement of the actual landing location of the reflected beam from its expected landing location, compiling a database of the displacement measurements, examining at least one displacement measurement in the database for effects of a pattern induced anomaly in the displacement measurements, selectively correcting the displacement measurements to produce an adjusted database, and deriving the characteristic of the substrate from the adjusted database. Thus, pattern induced errors from the displacement measurements are corrected. In a most preferred embodiment the correction is achieved by deriving the tilt at an inspection point and subtracting the tilt at one inspection point from the tilt at a comparable point in an adjoining pattern.

In an alternate embodiment, the method includes directing an incident beam at a inspection grid of points on the substrate where the points are selected so that the reflected beam from each point in the inspection grid will have minimal distortion, receiving the reflected beam with a position sensitive detector, measuring the displacement of the reflected beam at each point from its expected location, and deriving the characteristic, such as topography, of the substrate from the displacement measurements.

In some embodiments the method includes adjusting the incident beam with a collimating lens such that incident beams are parallel for at least two points on the inspection grid. In some embodiments the incident beam is comprised of more than one wavelength and in some embodiments the incident beam is multiplexed between two or more wavelengths. In some embodiments the method for directing the incident beam between points on the patterned substrate comprises redirection by a galvo driven mirror, and in other embodiments the method for directing the incident beam between points on the patterned substrate comprises redirection by an acousto optic modulator.

In some embodiments the position sensitive detector is a segmented detector, in other embodiments the position sensitive detector is an imaging detector, and in another embodiment the detector is a current sharing position sensitive detector.

According to another aspect of the invention there is described an apparatus for measuring a characteristic of a substrate. A beam generator produces an incident beam, a scanner directs the path of the incident beam onto a substrate such that the incident beam strikes inspection points on a inspection grid, where the spacing of the inspection points along a first axis of the inspection grid is a submultiple of a repeat dimension of the pattern in that axis. A modulator causes the incident beam to strike the substrate when the incident beam is pointed at each inspection point. A position sensitive detector receives the reflected beam and produces an electronic signal representing the displacement of the reflected beam from its expected location. A controller collects the data on the displacement of the reflected beam from its expected location, and compiles a database of displacement measurements. The repeat dimension of the pattern along the first axis is used to analyze the displacement measurements in the database for pattern induced anomalies in the displacement measurements. The controller corrects the displacement measurements if the errors exceed a defined threshold, to produce an adjusted database, and outputs data defining the characteristic of the substrate. The controller computes the difference between data values corresponding to two equivalent points on the pattern. These equivalent points are separated by one repeat distance. The difference values form a new database from which the curvature can be extracted.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
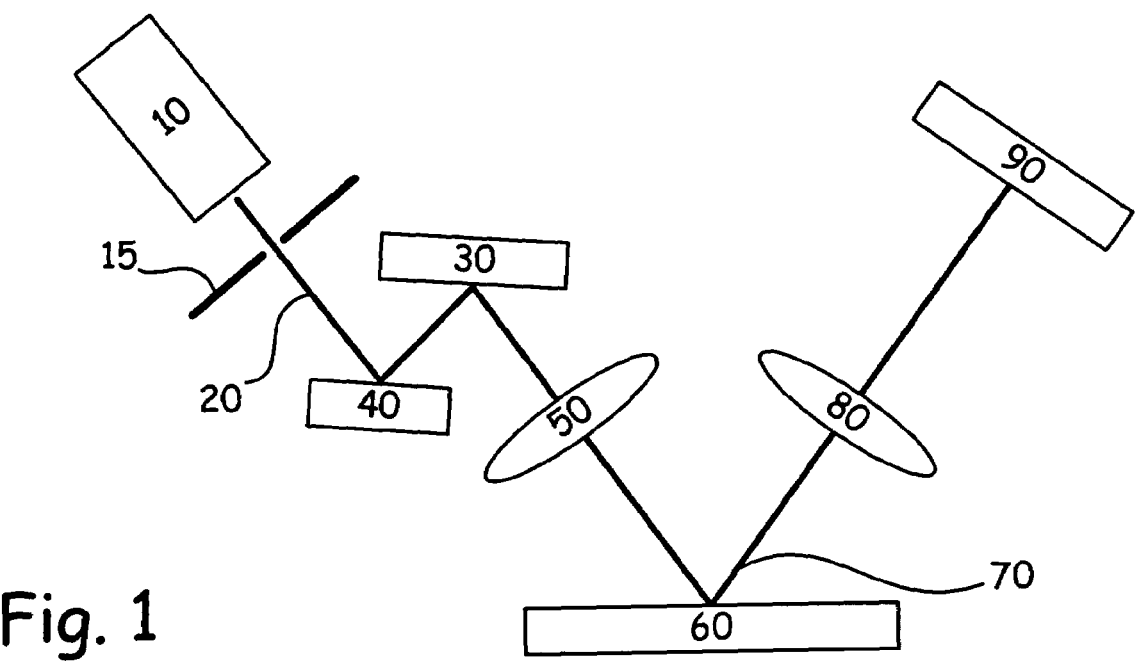
FIG. 1 is a schematic view of a mapping system illustrating the path of a beam through the apparatus.

With reference now to FIG. 1, there is depicted a laser 10 which produces an incident laser beam 20. Means such as a beam modulator 15 preferably turns off and turns on the incident laser beam 20. In some embodiments the laser 10 is a diode laser which is modulated directly by its excitation current and no separate modulator 15 is used. A vertical scanner 30 and horizontal scanner 40 typically combine to provide a mechanism for directing the incident laser beam 20 across the surface of a substrate 60. In many embodiments the substrate 60 is a wafer used in the fabrication of integrated circuits. For example, substrates formed of a monolithic semiconducting material such as a group IV material like silicon or germanium or a group III–IV material like gallium arsenide are preferably used. In many instances the substrate 60 has at least one thin film coating (not shown) on its surface, and the term "substrate" as used herein is intended to connote both bare substrates 60 and substrates 60 with thin film coatings.

In some embodiments a collimating lens 50 is used to direct the incident laser beam 20 on parallel paths toward the substrate 60 regardless of the position of the vertical scanner 30 and the horizontal scanner 40. The incident laser beam 20 is reflected from the surface of the substrate 60 as a reflected laser beam 70. A focusing lens 80 is preferably used to direct the reflected laser beam 70 toward the center of a position sensitive detector 90. In a preferred embodiment the position sensitive detector 90 detects the location of the reflected laser beam 70 in two dimensions. In some embodiments a segmented detector, such as a quadrant detector, is used as the position sensitive detector 90. The position sensitive detector 90 can be, for example, a charge coupled device.

Figure 2:
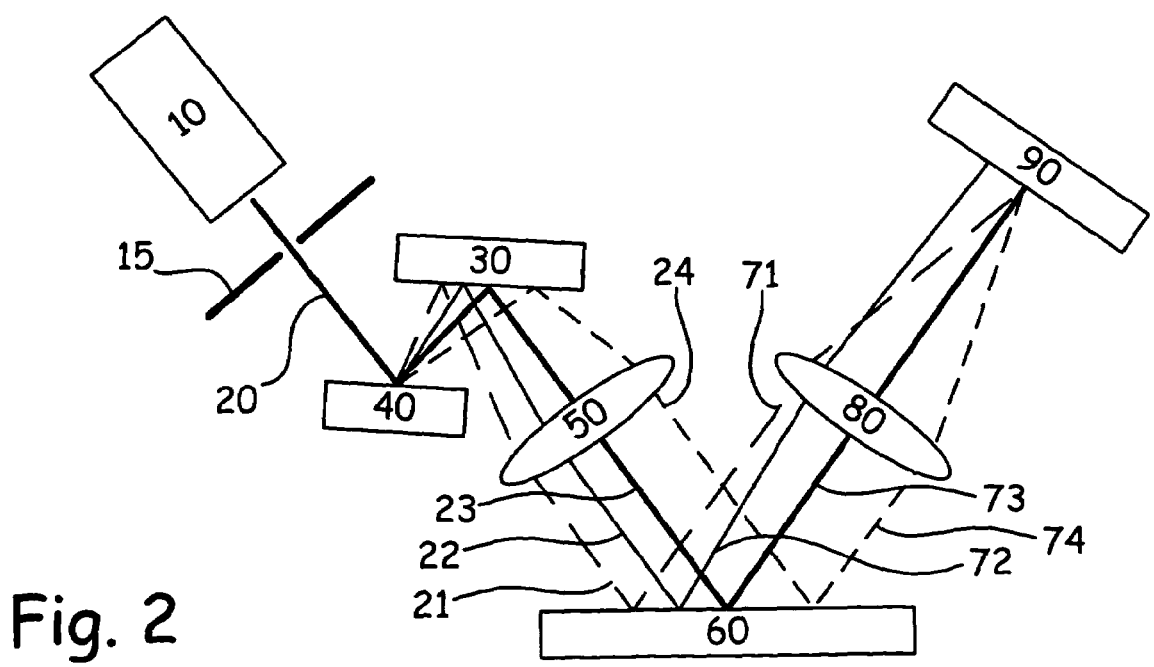
FIG. 2 is a schematic view of a mapping system illustrating multiple beam paths.

FIG. 2 depicts the light paths of several rays of light 21–24 that vary in location depending upon the position of the vertical scanner 30 and horizontal scanner 40. For example, when horizontal scanner 40 is in one configuration, incident laser beam 20 is directed along incident ray 21, where it is reflected from the surface of substrate 60 as reflected ray 71. When horizontal scanner 40 is in a different configuration, incident beam 20 is directed along incident ray 22, where it is reflected from the surface of substrate 60 as reflected ray 72. Similarly, incident ray 23 is reflected as reflected ray 73 and incident ray 24 is reflected as reflected ray 74.

Figure 3:
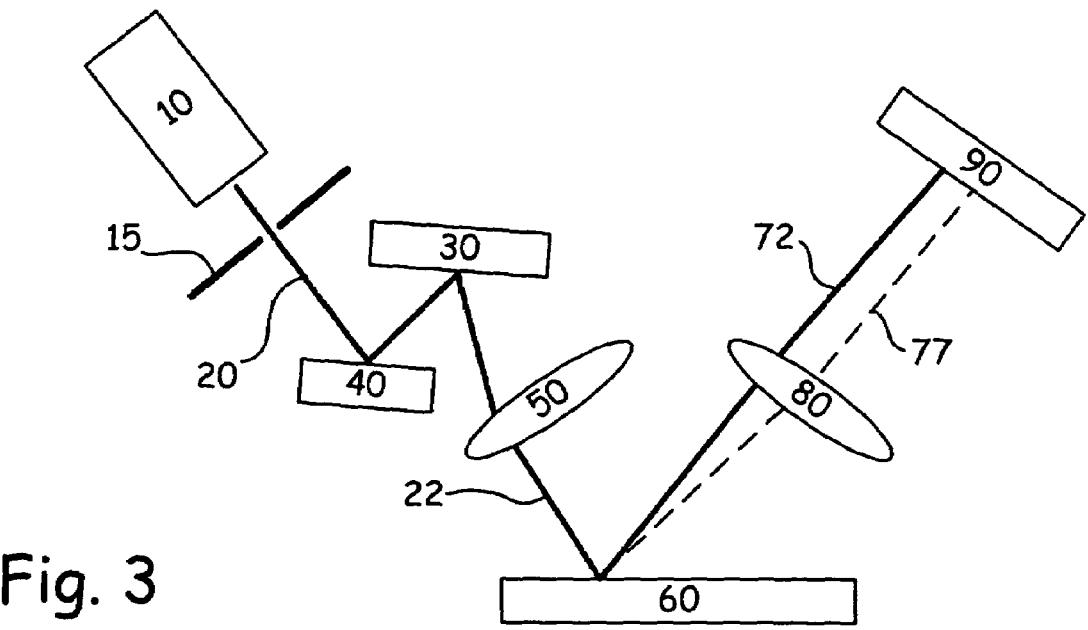
FIG. 3 is a schematic view of a mapping system illustrating the effect of an anomaly in the surface of the substrate on the path of the beam.

FIG. 3 illustrates the path 22 of incident ray 20 when it is directed at a spot on the substrate 60 where there is an anomaly on the surface of the substrate 60. Without the anomaly the reflected ray 72 would be directed along virtual path 77 to the center of the position sensitive detector 90. However, because of the anomaly the reflected ray 72 strikes the position sensitive detector 90 off center.

Figure 4:
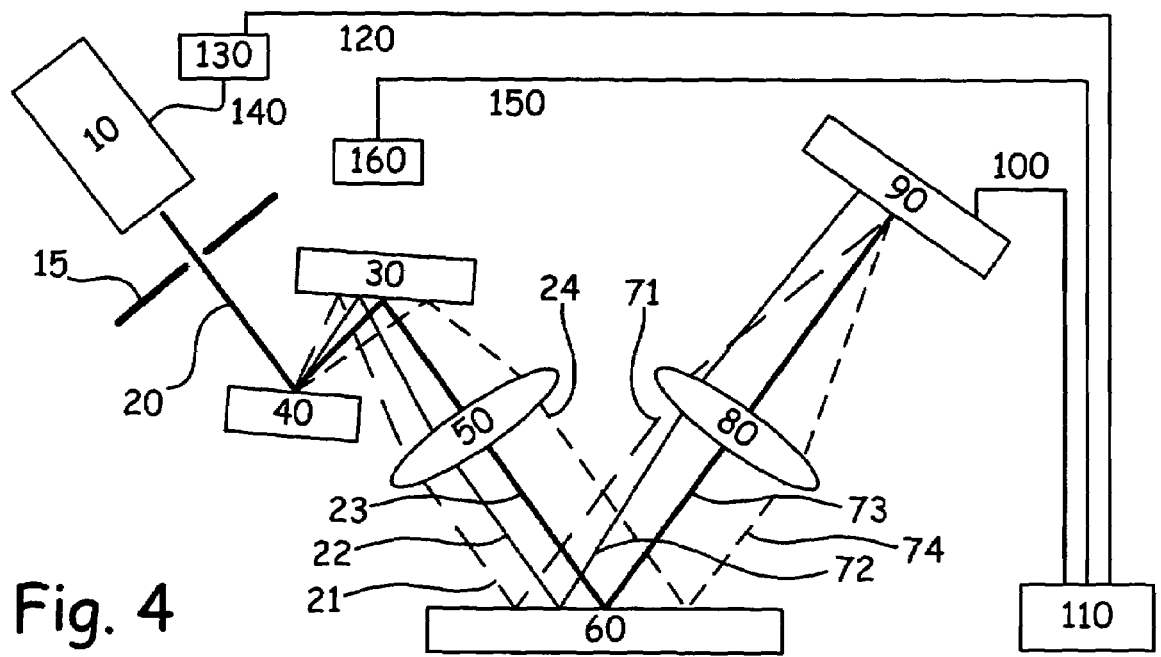
FIG. 4 depicts a complete measuring system that incorporates a controller attached to the mapping system.

FIG. 4 schematically illustrates a most preferred embodiment where a computer 110 is connected by a detector interface cable 100 to the position sensitive detector 90. The position sensitive detector 90 uses the detector interface cable 100 to send electronic signals to the computer 110. The electronic signals from the position sensitive detector 90 convey the location where the reflected ray 72 has struck the position sensitive detector 90. The amount of variance, and optionally the direction of variance, from the center of the position sensitive detector 90 is typically recorded by the computer 110, and subsequently herein that information is referred to as a displacement measurement.

Successive signals conveying the location where a reflected laser beam 70 strikes the position sensitive detector are sent to the computer 110 by the position sensitive detector 90 as the vertical scanner 30 or the horizontal scanner 40 move the incident laser beam 20 across the surface of the substrate 60. Typically, displacement measurements are recorded for locations which constitute an orthogonal inspection grid across the surface of the substrate. The scanning can be done by quick jumps to each desired point on the inspection grid, or by a continuous motion, or by a series of continuous motions interspersed with quick jumps. Scanning is generally quicker than alternate methods, such as using microposition controllers that could alternately be used to move the substrate under the incident laser beam 20, or in combination with a scanning method. Also, with scanning, the effects of any low frequency vibrations of the substrate 60 are significantly reduced. In some embodiments the order and timing of the scan positions are varied to reduce the sensitivity of the system to different substrate 60 vibration mode frequencies.

A reflected laser beam 70, such as the reflected ray 72, may strike the position sensitive detector 90 off center for several reasons. One reason is that the substrate 60 may have become warped by the process of depositing and modifying thin films on the substrate 60. Another reason is that the incident laser beam 20 may strike a dislocation in the thin films on the surface of the substrate 60. Dislocations occur in the thin films as they are deposited to form the components of integrated circuits, particularly at the edges of the individual components and their interconnecting elements in each integrated circuit. A third reason that a reflected laser beam 70, such as the reflected ray 72, may strike the position sensitive detector 90 off center is that the reflected laser beam 70 may strike a local defect in the substrate 60 material or a thin film deposit on the substrate 60.

It is of great value to distinguish anomalies attributable to the substrate 60 warping from anomalies attributable to discontinuities or local defects. If the substrate 60 is excessively warped, stresses are induced in the thin films, and those stresses may cause operational failures in a large fraction of the integrated circuits. Knowing the extent of such warping permits the fabricator to decide whether to scrap an entire substrate while it is still in process rather than invest further resources to complete its fabrication.

Integrated circuits are typically fabricated in an orthogonal layout with uniform spacing in both dimensions across the substrate. The amount of the spacing in one dimension is typically different than the spacing in the other dimension, but the spacing is uniform in each dimension. This uniform orthogonal spacing forms a repeat pattern in two axes across the surface of the substrate 60. In a most preferred embodiment, the scan trace created by the vertical scanner 30 and the horizontal scanner 40 is programmable and the trace is adjusted to form a periodic orthogonal inspection grid on the substrate 60 such that the inspection grid is generally congruent with the layout of the integrated circuits.

Also, in a most preferred embodiment, the inspection grid spacing in each dimension is a submultiple of the repeat dimension of the repeat pattern in that dimension. For example, if the integrated circuits are spaced at six millimeter intervals in one dimension across the substrate, and if the inspection grid is congruent with the layout of the integrated circuits, preferred spacing of inspection points on the inspection grid would include spacings in that dimension of one, or one and one half, or two, or three millimeters.

The benefit of having an inspection grid spacing in each dimension that is a submultiple of the repeat dimension of the repeat pattern in that dimension is that submultiple spacing permits identification of anomalous displacement measurements that are attributable to dislocations in the thin films on the surface of the substrate 60. These anomalies are referred to as pattern induced systematic anomalies. If integrated circuits are spaced at six millimeter intervals in one dimension, and an inspection point on the grid falls on a dislocation in the thin film that represents the edges of a particular individual component of the circuit, then by using an inspection grid spacing that is a submultiple of six millimeters, an inspection point is established six millimeters away and the incident laser beam 20 will hit the same edge of the same component on both integrated circuits. Except for any local surface differences between the two points, the displacement measurement will be the same for both locations. As subsequently described, this permits detection of the pattern and cancellation of its effects when mapping the surface of the substrate 60.

In a preferred embodiment the computer 110 is programmed to compile a database of displacement measurements, examine the database for effects of a pattern induced systematic anomalies in the displacement measurements, and correct examined displacement measurements to produce an adjusted database. The most preferred method of correcting examined displacement measurement is to calculate the tilt represented by the displacement measurements, and for each point subtract the tilt from the equivalent point on a neighboring integrated circuit to arrive at a corrected tilt for that point. If the position sensitive detector 90 is a two dimensional detector, the tilt subtraction is generally a vector subtraction.

The corrected tilt values are preferably provided as input to software running on the computer 110 to calculate curvature of the substrate 60 at selected points. Such software may employ simple geometric algorithms to compute the radius of curvature of the substrate 60, or more sophisticated algorithms to deduce a full surface height map of the substrate 60, such as described in "A Line-integration Based Method for Depth Recovery from Surface Normals," Zhongquan Wu and Linzao Li, *Computer Vision, Graphics, and Image Processing*, volume 43 (1988), the disclosure of which is incorporated herein in its entirety by reference. The computer 110 typically stores this information for selected successive integrated circuit fabrication steps. Changes in substrate curvature between such steps are provided as input either to Stoney's equation or to more sophisticated two dimensional algorithms based on finite element analysis, which is used by the computer 110 to compute the resultant stress induced in the thin films by the intervening processes that were performed on the substrate.

In an alternate embodiment, the scan patterns are programmed so that the incident beam 20 only hits points on the substrate 60 where there will be no pattern dislocations in the thin films on the surface of the substrate 60, so that distortions in the displacement measurements are minimal. In this embodiment, corrections for pattern induced anomalies is typically not necessary. It is also possible to vary the order and timing of the scan positions in order to reduce sensitivity to different substrate 60 vibration mode frequencies.

In preferred embodiments the computer 110 controls the operation of the laser 10. As shown in FIG. 4, this is preferably achieved by using a laser interface cable 120 connected between the computer 110 and the laser electronics unit 130, and using a laser controller cable 140 connected between the laser electronics unit 130 and the laser 110. In many embodiments, electronic signals sent over the laser interface cable 120 are used by the computer 110 to instruct the laser electronics unit 130 to fire the laser 10. When so instructed, electronic signals sent over the laser controller cable 140 to the laser 10 are preferably used to actually fire the laser 10. In some embodiments, electronic signals sent over the laser interface cable 120 by the laser electronics unit 130 are used to convey timing information on the firing of the laser 10 to the computer 110. In embodiments which employ a modulator 15, the computer 110 preferably also controls the operation of the modulator 15, and that control is most preferably accomplish by the laser electronics unit 130.

In preferred embodiments the computer 110 also controls the operation of the vertical scanner 30 and the horizontal scanner 40. As shown in FIG. 4, this is preferably achieved by using a scanner interface cable connected between the computer 110 and a scanner controller 160. The scanner controller 160 drives the configuration of the vertical scanner 30 and the horizontal scanner 40 by electrical or mechanical mechanisms which are not illustrated.

In preferred embodiments both a vertical scanner 30 and a horizontal scanner 40 are employed to move the incident laser beam 20 across the substrate 60 in two dimensions. However, in some embodiments it may be sufficient to employ only a vertical scanner 30 or only a horizontal scanner 40, which creates a one dimensional linear inspection grid.

In some embodiments the vertical scanner 30 and horizontal scanner 40 are moved by galvo driven mirrors. In some embodiments the vertical scanner 30 and horizontal scanner 40 employ acousto optic modulators to deflect the incident laser beam 20 to its intended inspection locations on the substrate 60. In some embodiments a combination of galvo driven mirrors and acousto optic modulators are employed with the vertical scanner 30 and horizontal scanner 40.

In the most preferred embodiments the acquisition of the displacement information by the computer 110 from the position sensitive detector 90 is synchronized with the operation of laser 10, the vertical scanner 30, and the horizontal scanner 40. In some embodiments the vertical scanner 30 and the horizontal scanner 40 may continuously sweep the surface of the substrate 60, and computer 110 may integrate the displacement measurement information over time to improve accuracy.

In some embodiments the substrate 60 is moved laterally under the incident laser beam 20. Such lateral movement is typically accomplished by micro positioning devices (not shown). Such lateral movement may be employed instead of using a vertical scanner 30 or instead of using a horizontal scanner 40, or instead of using either a vertical scanner 30 or a horizontal scanner 40. In some embodiments, lateral movement of the substrate 60 is combined with the use of a vertical scanner 30 or the use of a horizontal scanner 40. In the most preferred embodiments, one region of the substrate 60 is scanned both horizontally and vertically, and then the substrate 60 is moved so that another region of the substrate 60 can be scanned both horizontally and vertically.

In some embodiments an imaging detector, such as a charge coupled device, is used instead of a position sensitive detector 90. In these embodiments the incident laser beam 20 is generally chopped by a beam modulator 15 in order to form a set of discrete spots on the imaging detector. In some embodiments the beam modulator 15 is an acousto optic device, in other embodiments it is an electro optic device.

In some embodiments the optics are arranged so that there is only one lens, and the incident laser beam 20 and the reflected laser beam 70 are substantially perpendicular to the surface of the substrate 60, and a beam splitter is used to separate the incident laser beam 20 from the reflected laser beam 70.

In some embodiments the incident laser beam 20 comprises at least two wavelengths of light. In some embodiments transmission of the incident laser beam 20 is multiplexed between two wavelengths of light. The use of more than one wavelength of light makes detection of the location of the surface of the substrate 60 easier in situations where the surface contains thin films that are transparent to a certain band of wavelengths, and the reflectivity at one of the wavelengths is relatively low.

In yet another embodiment, optics, such as the lenses 50 and 80, are arranged so that there is only one lens. In this embodiment, the incident beam 20 and the reflected beam 70 are substantially perpendicular to the substrate 60. A beam splitter is preferably used in this embodiment to separate the incident beam 20 and the reflected beam 70.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for measuring surface characteristics of a substrate having a repeating pattern of integrated circuits, the repeating pattern having a repeat dimension along a first axis, the method including the steps of:
    defining an inspection grid of points on the substrate, the inspection grid of points having a spacing along the first axis,
    directing an incident beam at the inspection grid of points on the substrate where the spacing of the points along the first axis is a submultiple of the repeat dimension of the repeating pattern along the first axis,
    reflecting the incident beam off the substrate to produce a reflected beam,
    receiving the reflected beam with a position sensitive detector,
    determining an actual landing location of the reflected beam on the position sensitive detector,
    measuring a displacement between the actual landing location of the reflected beam from an expected landing location of the reflected beam on the position sensitive detector,
    compiling a database of displacement measurements,
    examining at least two displacement measurements in the database,
    correcting at least one displacement measurement for effects of a pattern induced anomaly in the displacement measurements and producing an adjusted database, and
    deriving the surface characteristics of the substrate from the adjusted database.

2. The method of claim 1 wherein the step of correcting at least one displacement measurement for effects of a pattern induced anomaly in the displacement measurements comprises deriving a tilt at a point and subtracting the tilt at that point from the tilt at a comparable point in an adjoining pattern.

3. The method of claim 1 wherein the step of directing an incident beam at the inspection grid of points on the substrate comprises adjusting the incident beam with a collimating lens such that incident rays are substantially parallel for at least two points on the inspection grid.

4. The method of claim 1 wherein the incident beam is comprised of more than one wavelength.

5. The method of claim 1 wherein the incident beam is multiplexed between two wavelengths.

6. The method of claim 1 wherein the method for directing the incident beam between points on the substrate comprises redirection by a galvo driven mirror.

7. The method of claim 1 wherein the method for directing the incident beam between points on the substrate comprises redirection by an acousto optic modulator.

8. The method of claim 1 wherein the position sensitive detector is a current sharing detector.

9. A method for measuring a topography of a substrate, the method comprising the steps of:
    directing an incident beam at an inspection grid of points on the substrate where the points are selected so that a reflected beam from each point in the inspection grid has minimal distortion, wherein the incident beam is multiplexed between two wavelengths,
    receiving the reflected beam with a position sensitive detector,
    measuring displacements between actual landing locations of the reflected beam and expected landing locations,
    deriving the topography of the substrate from the displacement measurements.

10. The method of claim 9 wherein the step of directing an incident beam at the inspection grid of points on the substrate comprises using a collimating lens such that incident beams are substantially parallel for at least two points on the inspection grid.

11. The method of claim 9 wherein the method for directing the incident beam between the points on the substrate comprises redirection by a galvo driven mirror.

12. The method of claim 9 wherein the method for directing the incident beam between the points on the substrate comprises redirection by an acousto optic modulator.

13. The method of claim 9 wherein the position sensitive detector is a current sharing detector.

14. An apparatus for detecting a characteristic of a substrate having a repeating pattern, the apparatus comprising:
    a beam generator adapted to produce an incident beam along a path,
    a scanner adapted to direct the path of the incident beam onto a substrate such that the incident beam strikes the substrate at inspection points on an inspection grid where a spacing of the inspection points along a first axis of the inspection grid is a submultiple of a repeat dimension of the repeating pattern on the substrate along the first axis, thereby producing a reflected beam, a modulator adapted to cause the incident beam to strike the substrate when the incident beam is directed at one of the inspection points, a position sensitive detector adapted to produce an electronic signal representing a displacement measurement between an actual landing location of the reflected beam on the position sensitive detector and an expected landing location of the reflected beam on the position sensitive detector, a controller adapted to collect the displacement measurement, compile a database of displacement measurements, use the repeat dimension of the pattern to analyze the displacement measurements in the database for pattern induced anomalies in the displacement measurements, selectively correct the displacement measurements when errors due to a pattern induced anomaly exceed a threshold to produce an adjusted database, and output data indicating the characteristic of the substrate.

15. The apparatus of claim 14 further comprising a collimating lens adapted to intercept the incident beam after it passes from the scanner and before the incident beam strikes the substrate.

16. The apparatus of claim 14 wherein the incident beam is comprised of more than one wavelength.

17. The apparatus of claim 14 wherein the incident beam is multiplexed between two wavelengths.

18. The apparatus of claim 14 wherein the position sensitive detector is a current sharing detector.

* * * * *